United States Patent [19]

Papaieck

[11] 3,838,355

[45] Sept. 24, 1974

[54] BINARY CODED DIGITAL FREQUENCY SYNTHESIS

[75] Inventor: Robert J. Papaieck, Colts Neck, N.J.

[73] Assignee: Cutler Hammer, Inc., Milwaukee, Wis.

[22] Filed: July 23, 1973

[21] Appl. No.: 381,980

[52] U.S. Cl. .................... 331/39, 331/40, 325/184, 328/14

[51] Int. Cl. .................... H03b 21/02

[58] Field of Search .................. 328/14; 331/39, 40; 325/184, 443

[56] References Cited

UNITED STATES PATENTS

| | | | |
|---|---|---|---|
| 2,829,255 | 4/1958 | Bolie | 331/39 |
| 2,894,133 | 7/1959 | Bolie | 328/14 X |
| 3,212,024 | 10/1905 | King | 331/40 X |
| 3,235,815 | 2/1966 | Keicher | 331/39 |
| 3,372,347 | 3/1968 | Jones et al. | 331/39 |
| 3,454,883 | 7/1969 | Oropeza et al. | 328/14 |

*Primary Examiner*—John S. Heyman
*Attorney, Agent, or Firm*—Henry Huff

[57] ABSTRACT

Any one of a group of discrete frequencies, each offset from a starting frequency by a respective number of predetermined fixed frequency intervals, is generated selectively using only two driving frequencies, chosen in a sequence according to a binary coded representation of the number corresponding to the selected frequency.

The synthesis is readily adaptable to various numerical radices, and to any number of digital orders by an iterative technique realizable with a cascade arrangement of identical modules.

6 Claims, 2 Drawing Figures

BINARY CODED DIGITAL FREQUENCY SYNTHESIS

BACKGROUND

1. Field

This invention pertains to the art of generating electrical oscillations at selectable discrete frequencies by beat frequency techniques, with plural beating in a single channel, and more particularly to direct digital frequency synthesis.

2. Prior Art

The most pertinent art presently known to applicant is represented by the following U.S. Pat. Nos.:

| | |
|---|---|
| 2,829,255 | Bolie |
| 3,125,729 | Stone et al |
| 3,372,347 | Jones et al |
| 3,454,883 | Oropeza et al |

These references disclose various examples of synthesizers of the "add and divide" type, which generally require at least as many driving frequencies as there are units in the number base or radix. The Jones et al synthesizer performs the add and divide operation twice in each digit selector module, once with regard to each of two integral factors of the radix, thereby affording a reduction in the number of driving frequencies and some relaxation in filter requirements. The Oropeza et al patent discloses a binary synthesizer that resembles the present invention in certain respects but differs from it in other, basic respects.

None of the above synthesizers is capable of operation without three or more selectable driving frequencies, and none is adapted to direct binary coded digital control, with any radix other than two, without code conversion means.

SUMMARY

According to this invention, a series of synthesis stages, each, except the last, consisting of a frequency subtractive mixer followed by a frequency halving divider, are cascaded to form a digit selector module. The last stage consists of a subtractive mixer, usually followed by a frequency divider and a frequency multiplier cooperating to multiply the frequency by a constant K relating the number of stages per module, N, to the radix R. The number of stages per module, N, must be even and must be such that N binary digits (bits) are sufficient to express any of R different figures or digits, where R is the radix of the number system to be used. For example, the decimal system (R=10) requires four bits to express uniquely each of the ten figures 0 through 9, and the number N of stages per module must be at least four.

Either of two driving signals, of respective fixed frequencies $f_H$ and $f_L$, is selectively applied by means of double throw switches or gate circuits as an input to the mixer of each synthesis stage. Each mixer except the first also receives, as a second input, the output of the divider of the immediately preceding stage. The second input to the first stage mixer is a starting frequency signal from a preceding lower order digit selector module, or in the case of the lowest order module, from a reference source of the basic starting frequency F.

Each of the double throw switches or gate devices can be placed in either of two positions or conditions corresponding respectively to the binary digits 0 and 1. The N switches of an integer selector module can be set to an N-bit binary pattern, or word, that constitutes a binary coded representation of any desired one of the R figures or digits of the R-based number system to be used.

When the selected R-based digit is zero, the output frequency of the module is the same as the input frequency. When the selected digit is other than zero, the output frequency is greater than the input frequency by a corresponding number of discrete fixed frequency intervals or steps.

With n cascaded digit selector modules, the final output of the last module may be at any one of $R^n$ discrete frequencies from the starting frequency F to an upper frequency one step below F+F′, according to the n R-based digits selected by the n corresponding N-bit binary code words. The frequencies $f_H$ and $f_L$ of the driving signals are determined by the starting frequency F, the frequency selection range F′, and the number system radix R, as will be described. The frequency selection range F′ is defined as $R^n$ times the minimum frequency interval or step. By appropriate choice of the frequency relationships, the production of in-band spurious signals can be reduced to inappreciable levels, and the performance requirements of the necessary side band separation filters can be met by simple, inexpensive devices. The use of only two driving frequencies enables the design of a binary coded decimal synthesizer, for example, that is much simpler, more dependable, cheaper and smaller than any previous decimal synthesizer, and is capable of being controlled or programmed directly with BCD logic signals as commonly used in existing digital systems.

DRAWING

DESCRIPTION OF PREFERRED EMBODIMENTS

Figure 1:
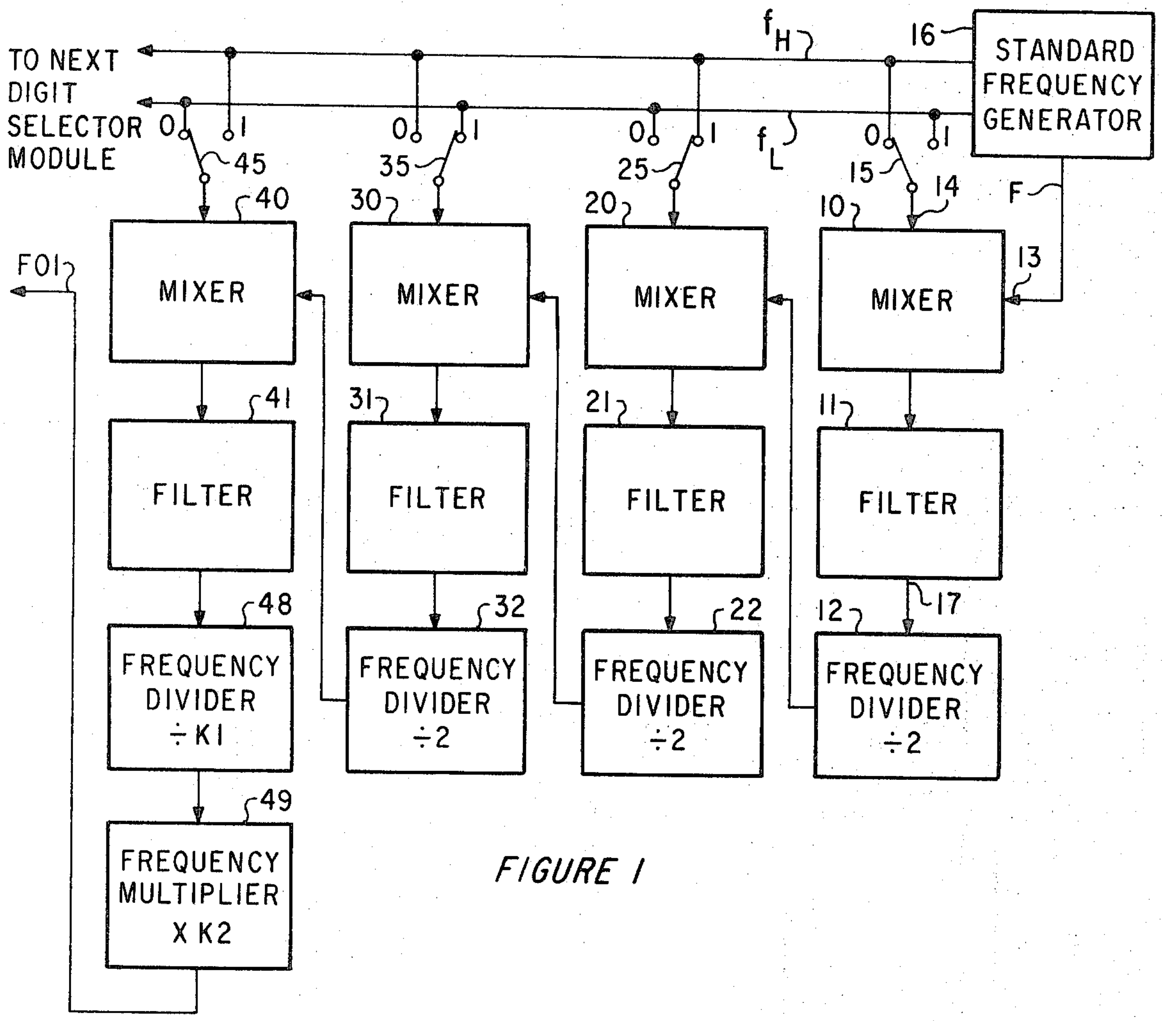
FIG. 1 is a schematic block diagram showing a typical digit selector module consisting of four synthesis stages.

Referring to FIG. 1, the first synthesis stage includes a mixer 10, a filter 11 and a frequency divider 12. The mixer has a first input terminal 13 adapted to receive a signal of the starting frequency F, and a second input terminal 14 adapted to receive selectively either of two driving signals, of frequencies $f_H$ and $f_L$ respectively, by way of a double throw switch device 15. The starting and driving signals are provided by a standard frequency generator 16 designed in any conventional manner to produce three separate outputs of fixed frequencies F, $f_H$ and $f_L$, related in a manner to be described.

In general, both driving signal frequencies $f_H$ and $f_L$ will be substantially higher than the starting frequency F. With the switch 15 in its left-hand position, designated 0 in the drawing, the output of the mixer 10 will include a component of frequency $f_H$−F. When the switch is in its right-hand position, designated 1, the mixer output will include a component of $f_L$−F.

The filter 11 is designed to pass frequencies of $f_L$−F and $f_H$−F, and to reject all other mixer output products of appreciable amplitudes. By appropriate practical choice of the frequency relationships between the three input signals, all undesired mixer products of amplitudes greater than, say −90 dB referred to the amplitude of the desired difference frequency components, may be made to occur at frequencies well outside the band between $f_L$−F and $f_H$−F, so that the filter 11 may be a simple band pass, or in some instances merely a low pass filter.

The mixer 10 and filter 11 may be denoted together as a frequency subtracting device, wherein the mixer input terminals 13 and 14 are called subtrahend and minuend input terminals and the filter output terminal 17 is a remainder output terminal. This terminal 17 is connected to the frequency divider 12, which is designed in known manner to produce an output of one half the frequency of its input. This output, which may be of either of two frequencies ½ ($f_H$−F) or ½ ($f_L$−F), depending upon the condition of the selector switch 15, is supplied as the subtrahend input to frequency subtracting device of the second synthesis stage.

The second stage, like the first, includes a selector switch 25, mixer 20, filter 21 and frequency divider 22. The connections of switch 25 to the $f_H$ and $f_L$ lines are reversed with respect to those of the first stage switch 15; that is, when switch 25 is set to its 0 position, the driving signal of frequency $f_L$ is applied to mixer 20, and when the switch 25 is set to its 1 position, the driving signal of frequency $f_H$ is applied to mixer 20.

The desired difference frequency output signal of the mixer 20 may be at any one of four different frequencies, depending upon the conditions of selector switches 15 and 25: $f_H$−½ ($f_L$−F), $f_H$−½ ($f_H$−F), $f_L$−½ ($f_L$−F) or $f_L$−½ ($f_H$−F). Accordingly, the filter 21 is designed to pass signals to these frequencies and reject all others of appreciable amplitude that may be present in the output of the mixer 20. In practice, the filter 21 may be a band pass filter with a pass band from the lowest desired frequency $f_L$−½ ($f_H$−F) to the highest $f_H$−½ ($f_L$−F). The output of filter 21 goes to the frequency divider 22, which produces an output of one half the frequency of that of the filter 21.

The output of divider 22 is supplied as the subtrahend input to the third synthesis stage which, like the first and second, includes a selector switch 35, mixer 30, filter 31 and frequency divider 32. The connections of switch 35 to the $f_H$ and $f_L$ lines are reversed with respect to those of the next preceding selector switch 25, and are the same as those of the first stage switch 15. The filter 31 may be a band pass filter similar to filter 21, but designed to pass the eight possible desired difference frequency outputs of the mixer 30.

The fourth, and in this instance final, stage includes a selector switch 45, mixer 40 and filter 41, but the divide-by-two divider characteristic of the other stages is in general replaced by a divide-by-K1 divider 48 and a multiply-by-K2 multiplier 49 connected in cascade to provide a resultant frequency multiplication of K=K2/K1, where K is a simple fraction less than unity, determined by the number of synthesis stages per digit selector module, N, and the radix R, as follows:

$$K=2^{(N-1)}/R.$$

In the present example, where N=4, K=8/R. Four synthesis stages are sufficient to accommodate any radix up to and including $R^4$=16. Two stages would be sufficient for any of radices 2, 3 and 4, and additional pairs of stages could be used for radices greater than 16.

The fourth stage mixer 40 can produce a difference output at any one of sixteen frequencies, depending on the positions of the selector switches 15, 25, 35 and 45. Filter 41 is designed to pass the R-1 lowest of these frequencies. The fourth selector switch 45 is connected to the driving signal lines in the same manner as the second switch 25.

The starting frequency F is chosen at some convenient value, preferably thirty or more times and desired basic frequency selection range F'. The driving signal frequencies are determined as follows:

$$f_L=3(R-1)F+F'/N_{2-1}$$

$$f_H=f_L+F'.$$

The output frequency F01 of the digit selector module is $$F+DF'/R,$$

where D is the numerical value of the digit, in the number system of radix R, represented in binary code by the positional pattern of the switches 15, 25, 35 and 45. The position of switch 15 (0 or 1) corresponds to the value (0 or 1) of the least significant bit of a four-bit binary word, the position of switch 25 corresponds to the value of the next higher (binary) order bit, and so on. With the switches set as shown in FIG. 1, the word is 0110, meaning $$0(8)+1(4)+1(2)+0(1)=6,$$

and the output frequency F01 is $$F+6F'/R.$$

As a specific example, assume that ten discrete selectable frequencies, at 0.1 MHz intervals, are to be produced over a selection range F' of one MHz. Then R=10, N=4 and K=8/10. Frequency divider 48 may be designed to divide by K1=5, and multiplier 49 to multiply by K2=4. The starting frequency F may be chosen at, say 30 MHz. The driving signal frequencies are determined as above to be $$f_L=1.8\times30\times1=55 \text{ MHz}$$

$$f_H=f_L+1=56 \text{ MHz}.$$

With all selector switches as 0, corresponding to the binary word 0000 representing the decimal figure 0, the frequencies in MHz at the indicated points in the circuit of FIG. 1 are:

| | |
|---|---|
| Inputs to mixer 10 | 30 and 56 |
| Output of mixer 10 | 26 |
| Output of divider 12 | 13 |
| Inputs to mixer 20 | 13 and 55 |
| Output of mixer 20 | 42 |
| Output of divider 22 | 21 |
| Inputs to mixer 30 | 21 and 56 |
| Output of mixer 30 | 35 |
| Output of divider 32 | 17.5 |
| Inputs to mixer 40 | 17.5 and 55 |
| Output of mixer 40 | 37.5 |
| Output of divider 48 | 7.5 |
| Output of multiplier 49 (F01) | 30 |

It is seen that in this case the output frequency F01 is the same as the starting frequency F. The output frequency F01 may be calculated similarly for all figures of a decimal decade, with the following results:

| D | BCD | F01 |
|---|---|---|
| 0 | 0000 | 30 |
| 1 | 0001 | 30.1 |

-Continued

| | | |
|---|---|---|
| 2 | 0010 | 30.2 |
| 3 | 0011 | 30.3 |
| 4 | 0100 | 30.4 |
| 5 | 0101 | 30.5 |
| 6 | 0110 | 30.6 |
| 7 | 0111 | 30.7 |
| 8 | 1000 | 30.8 |
| 9 | 1001 | 30.9 |

Although the selector switches are illustrated in FIG. 1 simply as SPDT switches, it will be apparent that they may be electrically operable devices as relays or gate circuits, adapted to be controlled by signals on output lines from a BCD data source such as a programming device or a digital computer. The single digit selector module of FIG. 1 can produce any of R different frequencies, corresponding to the R figures or numerals of one digital order. When, as is generally the case, a great many more than R different frequencies are desired within the selection range F′, a number *n* of digit selectors may be cascaded so as to provide $R^n$ available frequencies.

Figure 2:
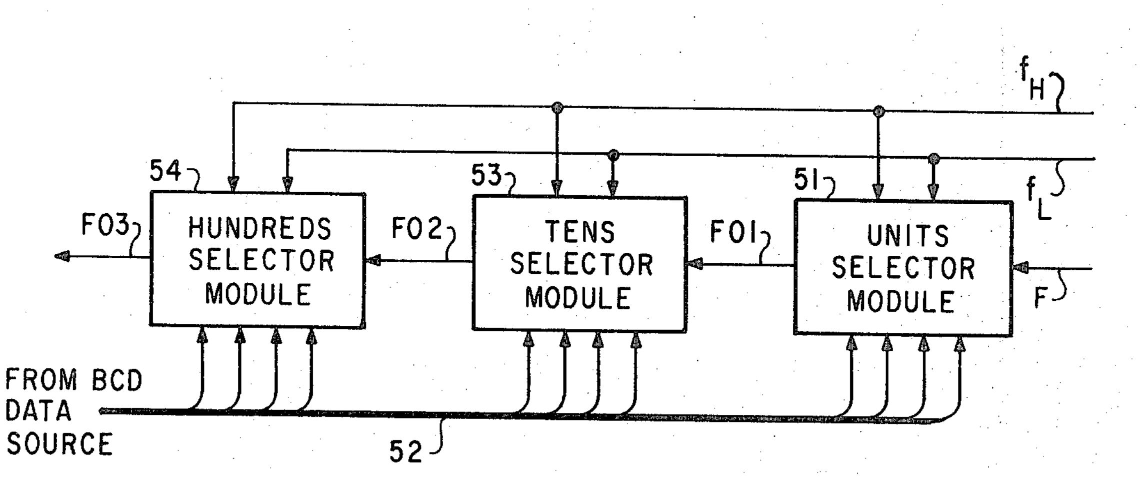
FIG. 2 is a schematic block diagram of a 1,000 step binary coded decimal synthesizer, including three cascaded digit selector modules similar to that of FIG. 1 and designed to operate with radix ten.

Referring to FIG. 2, the units selector module 51 is as shown in FIG. 1, designed as described to operate in radix ten. It is assumed in this example that the selector switches corresponding to switches 15, 25, 35 and 45 of FIG. 1 are electrically controllable, as logic gates, in known manner by signals applied to respective individuals of a group of control lines 52 from a BCD data source, not shown.

The tens selector module 53 is like the units module 51 except that its starting signal input is the output of module 51, at frequency F01. The output of the tens selector module 53, at a frequency F02, is applied as the starting signal input to the hundreds selector module 54, which in order respects is the same as modules 51 and 53.

The output frequency F03 of the hundreds module 54 is at any selected one of 1,000 discrete uniformly separated values in the selection range, each corresponding to a respective three-digit decimal number in the range from 0 to 999, inclusive. Assuming the input frequencies F, $f_H$ and $f_L$ as in the foregoing example, F03 can be any frequency selected, in 1 KHz increments, from 30 MHz to 30.999 MHz. Any specific one of the available frequencies can be produced in response to a respective pattern of signals on control lines 52 in the form of three four-bit binary words, each representing one of the three digits of the decimal number relating to that frequency.

For example, an output of frequency F03 of 30.236 MHz may be commanded by placing a pattern of control signals on conductors 52 according to the following bit pattern:

0010 0011 0110, wherein the first word represents the most significant digit, 2, of the decimal number denoting the desired frequency (in hundreds of KHz above the starting frequency of 30 MHz), the second word represents the next lower order decimal digit, 3, and the third word represents the lowest order or least significant digit 6. The first word sets the selector switch devices (corresponding to switches 45, 35, 25 and 15 in FIG. 1) in module 54 of FIG. 2, the second word sets those in module 53, and the third word sets those in module 51.

With the selectors set as above, the output frequency F01 of the units module 51 is 30.6 MHz. Starting from this frequency, the output frequency F02 of the tens module 53 is 30.36 MHz. Starting from the latter, the output frequency F03 of the hundreds module is 30.236 MHz.

Further selector modules may be cascaded following the hundreds module 54, as thousands, ten thousands, etc. modules. Each such additional module provides the capability of selecting ten times as many frequencies as the previous one, at intervals one-tenth as great. The frequency selection range remains essentially the same, from 30 MHz to 30.999....MHz. If desired, the entire selection range may be transferred to a different part of the spectrum, for example 0 to 0.999...MHz, by conventional techniques which are not part of this invention.

When the radix is less than $2^N$, the frequency selection range may be extended from F′ to a range $$F''=F'(2^N/r)$$

by minor modification of the most significant digit selector module. For example, the binary coded decimal synthesizer of FIG. 2 may be made to operate from 30 MHz to 31.599 MHz by designing the filter of the last synthesis stage of the hundreds selector module, i.e., the filter corresponding to filter 41 of FIG. 1, to pass frequencies up to 39.5 MHz instead of stopping at 38.75 MHz. Then the switches in the hundreds module may be set in six additional patterns by signals corresponding to additional four-bit words that represent additional decimal values 10, 11, 12, 13, 14, and 15. In all other respects, the synthesizer is the same and operates in the same manner as previously described.

I claim:

1. Apparatus for synthesizing $R^n$ discrete frequencies corresponding to respective binary coded representations of digits in n digital orders of a numerical system of radix R, including n cascaded digital selector modules, each corresponding to a respective one of said digital orders, each of said modules comprising:

a. an even number N, such that N binary bits are sufficient to express all figures of the numerical system, of frequency subtracting devices each having subtrahend and minuend input terminals and a remainder output terminal, the subtrahend input terminal of said first subtracting means constituting the input terminal of the module, b. N—1 frequency halving devices, each coupling the subtrahend input terminal of a respective subtracting device, other than the first, to the output terminal of the immediately preceding subtracting device, c. means for providing only two driving signals of predetermined respective frequencies, d. switch means for selectively applying one of said driving signals to the minuend input terminal of each of said frequency subtracting devices in accordance with the binary valve to be represented at a corresponding bit position, and e. means for multiplying the frequency of the output of the last of said frequency subtracting devices by a constant $2^{(N-1)}/R$ that relates the number of halving devices to the radix.

2. The apparatus set forth in claim 1, wherein said $R^n$ discrete frequencies include a starting frequency F, and lie in a range between F and F+F′, said driving signal frequencies being predetermined therefrom as follows:

$$f_L = 3(R-1)/2^N - 1\ F + F'$$

and $$f_H = f_L + F',$$

wherein $f_L$ is the lower and $f_H$ is the higher of said driving signal frequencies, and the input to the first of said modules is a signal of the starting frequency F.

3. The apparatus set forth in claim 1, wherein said switch means for selectively applying said driving signals to said subtracting devices are connected to successive ones of said subtracting devices in alternate senses, to represent a binary bit value of zero by the higher of said driving frequencies in the first and subsequent odd-numbered ones of said subtracting devices, and by the lower of said driving frequencies in the second and subsequent even-numbered ones of said subtracting devices, and the other of said driving frequencies in each case representing a binary bit value of one.

4. The apparatus set forth in claim 3, wherein the last of said digital orders, is designed to operate over an extended frequency selection range $$F'' = F'(2^N/R),$$

and said switch means of said last module may be set to represent binary words exceeding that corresponding to the radix R, whereby a total of $2^N R^{(N-1)}$ discrete frequencies can be synthesized.

5. A digit selector module for frequency synthesis with binary coding in a number system of a given radix, comprising:

a. an even number N, such that N binary bits are sufficient to express all figures of the radix, of frequency subtracting devices each having subtrahend and minuend input terminals and a remainder output terminal, the subtrahend input terminal of said first subtracting means constituting the input terminal of the module, b. N−1 frequency halving devices, each coupling the subtrahend input terminal of a respective subtracting device, other than the first, to the output terminal of the immediately preceding subtracting device, c. means for providing only two driving signals of predetermined respective frequencies, d. means for selectively applying one of said driving signals to the minuend input terminal of each of said frequency subtracting devices, and e. means for multiplying the frequency of the output of the last of said frequency subtracting devices by a constant that relates the number of halving devices to the radix.

6. A digit selector module for binary coded decimal frequency synthesis in a range between F and F+F′, comprising:

a. four frequency subtracting devices each having a subtrahend input terminal, a minuend input terminal and a remainder output terminal, the subtrahend input terminal of said first subtracting means constituting the input terminal of the module.

b. three frequency halving devices, each coupling the subtrahend input terminal of a respective subtracting device, other than the first, to the output terminal of the immediately preceding subtracting device, c. means for selectively applying one of two driving signals of frequencies $f_L$ and $f_H$ to the minuend input terminal of each of said frequency subtracting devices, said frequencies being predetermined as follows:

$$f_L = (9/5)\ F + F'$$

$$f_H = f_L + F'$$

d. and means for multiplying the frequency of the output of the last of said subtracting devices by 4/5.

* * * * *